(12) United States Patent
Yoshizawa et al.

(10) Patent No.: US 10,304,485 B2
(45) Date of Patent: May 28, 2019

(54) MAGNETIC RECORDING MEDIUM

(71) Applicant: FUJI ELECTRIC CO., LTD., Kawasaki-shi (JP)

(72) Inventors: Tsuyoshi Yoshizawa, Matsumoto (JP); Hiroto Kikuchi, Matsumoto (JP); Takehito Shimatsu, Sendai (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 0 days.

(21) Appl. No.: 15/640,809

(22) Filed: Jul. 3, 2017

(65) Prior Publication Data

US 2017/0301367 A1    Oct. 19, 2017

Related U.S. Application Data

(63) Continuation of application No. PCT/JP2016/003068, filed on Jun. 24, 2016.

(30) Foreign Application Priority Data

Jul. 2, 2015    (JP) .................................. 2015-133885

(51) Int. Cl.
| | |
|---|---|
| *G11B 5/65* | (2006.01) |
| *G11B 5/66* | (2006.01) |
| *G11B 5/82* | (2006.01) |
| *G11B 5/00* | (2006.01) |

(52) U.S. Cl.
CPC ............. *G11B 5/653* (2013.01); *G11B 5/65* (2013.01); *G11B 5/66* (2013.01); *G11B 5/82* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 9,984,709 | B1 * | 5/2018 | Huang | ..................... G11B 5/66 |
| 2003/0108721 | A1 * | 6/2003 | Fullerton | ................ G11B 5/66 |
| | | | | 428/195.1 |

(Continued)

FOREIGN PATENT DOCUMENTS

| | | |
|---|---|---|
| JP | 2004213869 A | 7/2004 |
| JP | 2009-059461 A | 3/2009 |

(Continued)

OTHER PUBLICATIONS

Office Action issued in counterpart Japanese Patent Application No. 2017-526175, dated Sep. 5, 2017.

(Continued)

*Primary Examiner* — Kevin M Bernatz
(74) *Attorney, Agent, or Firm* — Venable LLP; Henry J. Daley; Kerri M. Patterson (57) ABSTRACT

The present invention aims at providing a magnetic recording medium capable of realizing lowering of recording temperature. A magnetic recording medium comprises a substrate, and a magnetic recording layer comprising a first magnetic layer and a second magnetic layer, in which the second magnetic layer comprises an FePtRh ordered alloy, and the first magnetic layer has Ku at room temperature larger than Ku of the second magnetic layer at room temperature.

3 Claims, 4 Drawing Sheets

(56) References Cited

U.S. PATENT DOCUMENTS

| | | | |
|---|---|---|---|
| 2004/0185306 A1* | 9/2004 | Coffey | G11B 5/00 428/828.1 |
| 2007/0159721 A1 | 7/2007 | Honda et al. | |
| 2007/0172705 A1* | 7/2007 | Weller | G11B 5/66 428/827 |
| 2009/0040644 A1* | 2/2009 | Lu | G11B 5/314 360/59 |
| 2009/0161254 A1 | 6/2009 | Ishio et al. | |
| 2012/0052330 A1* | 3/2012 | Takekuma | G11B 5/66 428/829 |
| 2012/0214021 A1* | 8/2012 | Sayama | G11B 5/65 428/836.1 |
| 2014/0377590 A1* | 12/2014 | Uchida | G11B 5/65 428/829 |
| 2015/0138939 A1* | 5/2015 | Hellwig | G11B 5/66 369/13.41 |
| 2015/0213821 A1 | 7/2015 | Ono et al. | |
| 2016/0064022 A1* | 3/2016 | Thiele | G11B 5/653 428/800 |
| 2016/0225394 A1* | 8/2016 | Moriya | G11B 5/65 |
| 2017/0301368 A1* | 10/2017 | Kikuchi | G11B 5/66 |
| 2017/0352372 A1* | 12/2017 | Moriya | G11B 5/653 |
| 2017/0365286 A1* | 12/2017 | Uchida | G11B 5/65 |

FOREIGN PATENT DOCUMENTS

| | | |
|---|---|---|
| JP | 2009-151899 A | 7/2009 |
| JP | 2010-003408 A | 1/2010 |
| JP | 2012-048784 A | 3/2012 |
| JP | 2012221542 A | 11/2012 |
| JP | 2015-040244 A | 3/2015 |
| JP | 2015115089 A | 6/2015 |
| JP | 2016-051497 A | 4/2016 |
| WO | 2014/087665 A1 | 6/2014 |
| WO | 2015037425 A1 | 3/2015 |
| WO | 2015/151425 A1 | 10/2015 |

OTHER PUBLICATIONS

International Search Report in counterpart International Application No. PCT/JP2016/003068, dated Aug. 30, 2016.

Written Opinion of the International Searching Authority issued in counterpart International Application No. PCT/JP2016/003068, dated Aug. 30, 2016.

* cited by examiner

MAGNETIC RECORDING MEDIUM

CROSS-REFERENCE TO RELATED APPLICATIONS

This application is a continuation application of PCT application No. PCT/JP2016/003068 under 37 Code of Federal Regulations § 1.53 (b) and the said PCT application claims the benefit of Japanese Patent Application No. 2015-133885, filed Jul. 2, 2015, which are hereby incorporated by reference wherein in their entirety.

BACKGROUND OF THE INVENTION

Field of the Invention

The present invention relates to a magnetic recording medium. Specifically, it relates to a magnetic recording medium for use in a hard disk magnetic recording device (HDD).

Description of the Related Art

Recently, higher density magnetic recording is in high demand. As a technology for realizing the high density of the magnetic recording, a perpendicular magnetic recording method is employed. The perpendicular magnetic recording medium includes at least a non-magnetic substrate and a magnetic recording layer formed from a hard magnetic material. The perpendicular magnetic recording medium may further include, optionally, a soft magnetic under layer which is formed from a soft magnetic material and plays a role of concentrating a magnetic flux generated by a magnetic head on the magnetic recording layer, an underlayer for orienting the hard magnetic material of the magnetic recording layer in an intended direction, a protective film for protecting a surface of the magnetic recording layer and the like.

In order to make the density of magnetic recording high, high thermal stability is necessary, and therefore there is proposed a magnetic recording layer constituted from a material having high magnetic anisotropy such as FePt. However, FePt has high coercive force at room temperature, and with an ordinary recording head, recording cannot be performed because a magnetic field is insufficient. Therefore, a heat-assisted magnetic recording system is proposed.

A heat-assisted magnetic recording system is a recording system in which a magnetic recording layer is irradiated with laser to heat and lower the coercive force, and in the state, the magnetic field for recording is applied to reverse magnetization. In a heat-assisted magnetic recording system, a magnetic material is heated to near the Curie temperature and is recorded. For example, it is known that the Curie temperature (Tc) of FePt is around 720 K.

On the other hand, recording at high temperatures brings about deterioration of a carbon protective film for protecting a magnetic recording layer or a lubricant on a protective film to be a cause of deterioration of the recording head itself, which becomes, therefore, a factor that significantly lowers the reliability of a magnetic recording device. Accordingly, it is desired to perform recording at a temperature as low as possible.

Japanese Patent Laid-Open No. 2009-059461 proposes that a plurality of magnetic layers are provided and different magnetic anisotropy constants (Ku) and Tc are set in the respective magnetic layers to thereby relax the correlation between Ku and Tc. Specifically, in the proposal in Japanese Patent Laid-Open No. 2009-059461, a magnetic recording layer includes a first magnetic layer having Curie temperature Tc1 and a second magnetic layer having Curie temperature Tc2, in which the relationship of Tc1>Tc2 is satisfied. Hereby, when the magnetic recording layer is heated to temperatures higher than Tc2, exchange coupling between the first magnetic layer and the second magnetic layer is cancelled to make recording to the first magnetic layer possible.

Further, in Japanese Patent Laid-Open No. 2009-059461, the addition of Cu or the like to FePt is proposed in order to lower Tc.

Japanese Patent Laid-Open No. 2009-151899 discloses a magnetic recording medium in which a magnetic recording layer deposited on a non-magnetic substrate includes a plurality of ferromagnetic regions separated from each other by a diamagnetic region, in an in-plane direction. Japanese Patent Laid-Open No. 2009-151899 discloses that an alloy containing FePtRh as a main component is used in the ferromagnetic region and the diamagnetic region to achieve higher density and magnetic separation between magnetic bits and suppress deterioration of the surface. However, in Japanese Patent Laid-Open No. 2009-151899, the medium is a pattered medium, and there is no proposal regarding the lowering of recording temperature in magnetic recording.

SUMMARY OF THE INVENTION

However, even FePt with Cu added as disclosed in Japanese Patent Laid-Open No. 2009-059461 has comparatively high Tc. For example, even FePt with Cu in 10 at % added has Tc of 650 K. Accordingly, more lowering of recording temperature is desired in a magnetic recording medium.

A magnetic recording medium comprises: a substrate; and a magnetic recording layer comprising a first magnetic layer and a second magnetic layer, wherein the second magnetic layer comprises an FePtRh ordered alloy, and the first magnetic layer has Ku at room temperature larger than Ku at room temperature of the second magnetic layer.

In the magnetic recording medium, preferably, the first magnetic layer is formed on the substrate side and the second magnetic layer is formed in an upper layer of the first magnetic layer.

In the magnetic recording medium, preferably the first magnetic layer comprises an FePt ordered alloy.

In the magnetic recording medium, preferably, the first magnetic layer and second magnetic layer have a granular structure including a magnetic crystal grain and a non-magnetic crystal grain boundary surrounding the magnetic crystal grain.

The magnetic recording medium can lower the recording temperature and recording magnetic field, while keeping the thermal stability similar to the conventional one.

Further features of the present invention will become apparent from the following description of exemplary embodiments with reference to the attached drawings.

DESCRIPTION OF THE EMBODIMENTS

Figure 1A:
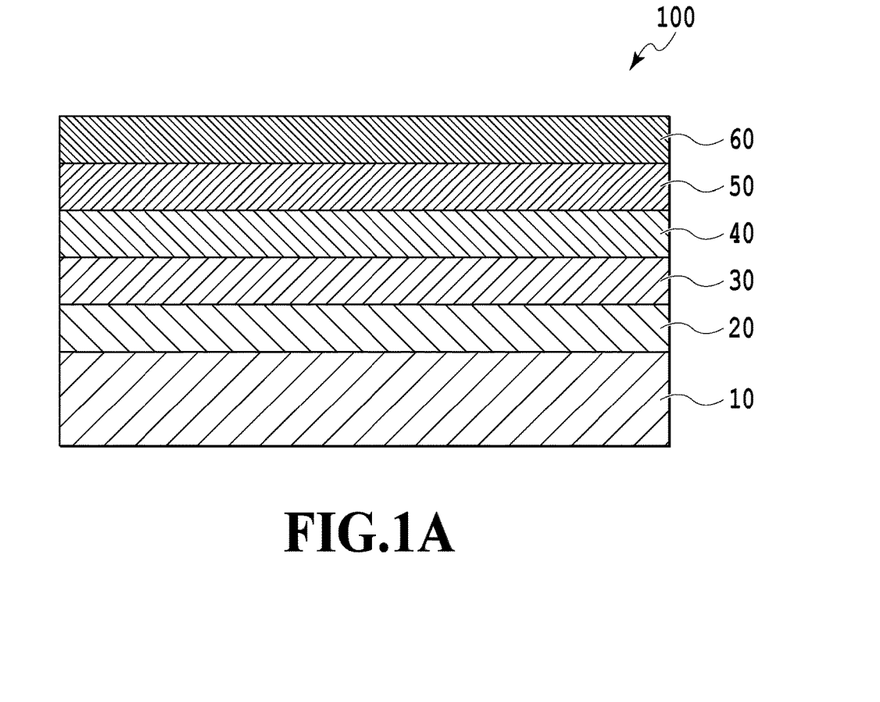
FIG. 1A is a cross-sectional view showing a structural example of a magnetic recording medium.
Figure 1B:
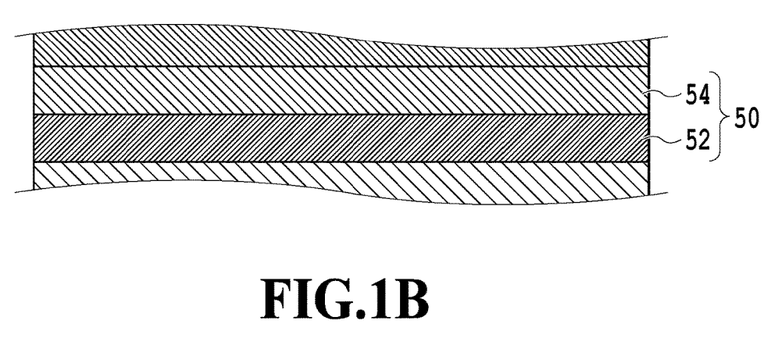
FIG. 1B is an expanded cross-sectional view of the magnetic recording layer of the magnetic recording medium shown in FIG. 1A.

A magnetic recording medium comprises: a substrate; and a magnetic recording layer comprising a first magnetic layer and a second magnetic layer, wherein the second magnetic layer comprises an FePtRh ordered alloy, and the first magnetic layer has Ku at room temperature larger than Ku at room temperature of the second magnetic layer. The magnetic recording medium may further comprise a layer or layers known in the art such as an adhesion layer, a soft magnetic under layer, a heat-sink layer, an underlayer and/or a seed layer, between the substrate and the magnetic recording layer. In addition, the magnetic recording medium may further include a layer or layers known in the art such as a protective layer and/or a liquid-lubricant layer, on the magnetic recording layer. An example of the magnetic recording medium includes a substrate, a magnetic recording layer comprising a first magnetic layer and an upper layer, and a protective layer. Further, FIG. 1A shows a structural example of a magnetic recording medium comprising a substrate 10, an adhesion layer 20, an underlayer 30, a seed layer 40, a magnetic recording layer 50, and a protective layer 60. The magnetic recording layer 50 of the magnetic recording medium comprises, as shown in FIG. 1B, a first magnetic layer 52 and a second magnetic layer 54. Expressions of an alloy or a material shown by elements such as FePtRh, FePt and FePt—C herein mean simply that the elements are contained as constituents, but do not specify a composition between the elements. Accordingly, for example, the expression of FePtRh shows only that constituent elements of the ordered alloy are Fe, Pt and Rh, and does not mean that the ratio of these constituent elements is 1:1:1. Further, such terms as "consisting of FePtRh", "consisting of FePt" and "consisting of FePt—C" herein mean that expressed elements are contained as constituents, and do not specify the ratio between elements being constituents. Accordingly, for example, "consisting of FePtRh" means that the material is constituted from elements only of Fe, Pt and Rh, and does not mean that the ratio of these elements is 1:1:1. When the percentage of elements is shown by a chemical formula herein, for example, such as "60 vol % $Fe_{50}Pt_{50}$-40 vol % C," composition between an ordered alloy and non-magnetic grain boundary material is shown in volume %, and, in "$Fe_{50}Pt_{50}$," "$Fe_{48}Pt_{42}Rh_{10}$" and the like, the composition of an ordered alloy is shown in atom % (at %).

The substrate 10 may be any substrate having a smooth surface. For example, the substrate 10 can be formed by use of a material generally used for a magnetic recording medium. Examples of usable materials include a NiP-plated Al alloy, a MgO single crystal, $MgAl_2O_4$, $SrTiO_3$, reinforced glass, crystallized glass, etc.

The adhesion layer 20 that may be provided optionally is used for enhancing adherence between a layer formed on the adhesion layer 20 and a layer formed beneath the adhesion layer 20. Layers to be formed beneath the adhesion layer 20 include the substrate 10. Materials for forming the adhesion layer 20 include metals such as Ni, W, Ta, Cr and Ru, and alloys comprising the metal. The adhesion layer 20 may be a single layer, or may have a laminated structure of a plurality of layers.

A soft magnetic under layer (not shown), which may be provided optionally, controls the magnetic flux from a magnetic head to improve the recording and reproducing characteristics of a magnetic recording medium. Materials for forming the soft magnetic under layer include (i) crystalline materials such as a NiFe alloy, a Sendust (FeSiAl) alloy and a CoFe alloy, (ii) microcrystalline materials such as FeTaC, CoFeNi and CoNiP, or (iii) amorphous materials containing a Co alloy such as CoZrNb and CoTaZr. The optimal value of thickness of a soft magnetic under layer depends on a structure and characteristics of a magnetic head for use in magnetic recording. When a soft magnetic under layer is formed by continuous deposition with another layer, in view of balance with productivity, a soft magnetic under layer preferably has a thickness lying within a range of 10 nm to 500 nm (both inclusive).

When the magnetic recording medium of the present invention is used in a heat-assisted magnetic recording system, a heat-sink layer (not shown) may be provided. The heat-sink layer is a layer for effectively absorbing excess heat of the magnetic recording layer 50 generated in the thermal-assist magnetic recording. The heat-sink layer can be formed by use of a material with high heat conductivity and specific heat capacity. Such materials include a Cu simple substance, a Ag simple substance, a Au simple substance or an alloy material mainly composed of them. Here, the phrase "mainly composed of" means that a content of the material concerned is 50 wt % or more. Further, from the viewpoint of strength or the like, the heat-sink layer can be formed by use of an Al—Si alloy, a Cu—B alloy, or the like. Moreover, the heat-sink layer can be formed by use of a Sendust (FeSiAl) alloy, a soft magnetic CoFe alloy, or the like. As the result of using the soft magnetic material, it is also possible to give, to the heat-sink layer, a function of concentrating a magnetic field in a perpendicular direction generated by the head on the magnetic recording layer 50 to thereby complement the function of the soft magnetic under layer. An optimal value of the thickness of the heat-sink layer varies with the heat quantity and heat distribution in the thermal-assist magnetic recording as well as with the constitutions of respective layers of the magnetic recording medium and a thickness of each layer. In a case of forming a heat-sink layer by continuous deposition with another layer, the thickness of the heat-sink layer is preferably 10 nm or more and 100 nm or less in view of balance with productivity. The heat-sink layer can be formed by use of any process known in the art concerned such as a sputtering method or a vacuum deposition method. Usually, the heat-sink layer is formed by use of a sputtering method. The heat-sink layer can be provided between the substrate 10 and the adhesion layer 20, between the adhesion layer 20 and the underlayer 30, and the like, in consideration of the properties required for the magnetic recording medium.

The underlayer 30 is for controlling crystallinity and/or crystalline orientation of the seed layer 40 formed on the upper side. The underlayer 30 may be a single layer or multiple layers. The underlayer 30 is preferably non-magnetic. A non-magnetic material used for forming the underlayer 30 includes (i) a single metal such as Pt metal or Cr metal, or (ii) an alloy obtained by adding at least one kind of metal selected from the group consisting of Mo, W, Ti, V, Mn, Ta and Zr to the Cr as a main component. The underlayer 30 can be formed by use of any process known in the art, such as a sputtering method.

The function of the seed layer 40 is to control a grain diameter of magnetic crystal grains and crystalline orientation in the magnetic recording layer 50 as the upper layer. The seed layer 40 may be given a function of securing adherence between a layer lying beneath the seed layer 40 and the magnetic recording layer 50. Further, another layer such as an intermediate layer may be disposed between the seed layer 40 and the magnetic recording layer 50. When an intermediate layer or the like is to be disposed, the particle size and crystalline orientation of crystal grains in an intermediate layer or the like are controlled to thereby control the particle size and crystalline orientation of magnetic crystal grains in the magnetic recording layer 50. The seed layer 40 is preferably non-magnetic. The material of the seed layer 40 may be selected suitably in accordance with the material of the magnetic recording layer 50. More specifically, the material of the seed layer 40 is selected in accordance with the material of magnetic crystal grains in a magnetic recording layer. For example, when the magnetic crystal grain in the magnetic recording layer 50 is formed from an $L1_0$-ordered alloy, preferably the seed layer 40 is formed by use of a NaCl type compound. Particularly preferably, the seed layer 40 can be formed by use of an oxide such as MgO or $SrTiO_3$, or a nitride such as TiN. Further, the seed layer 40 can also be formed by laminating a plurality of layers containing the above-described material. From the viewpoint of improving crystallinity of magnetic crystal grains in the magnetic recording layer 50 and improving productivity, the seed layer 40 has thickness of 1 nm to 60 nm, preferably thickness of 1 nm to 20 nm. The seed layer 40 can be formed by use of any process known in the art such as a sputtering method.

The magnetic recording layer 50 includes the first magnetic layer 52 and the second magnetic layer 54.

The first magnetic layer 52 comprises an element comprising an ordered alloy and, optionally, a third element. The first magnetic layer has higher Ku at room temperature as compared with the second magnetic layer 54.

An ordered alloy can comprise at least one element selected from the group consisting of Fe and Co, and at least one element selected from the group consisting of Pt, Pd, Au and Ir. A preferable ordered alloy is selected from the group consisting of FePt, CoPt, FePd and CoPd. An ordered alloy is also preferably an $L1_0$-ordered alloy. A preferable ordered alloy is FePt, and a particularly preferable ordered alloy is $L1_0$ type FePt. The first magnetic layer may further comprise at least one element selected from Cu, Ag, Au, Ni, Mn, Cr and the like, as a third element. These third elements are for realizing property modulation of the first magnetic layer, and the property modulation includes lowering of temperature necessary for ordering an ordered alloy. Alternatively, an ordered alloy included in the first magnetic layer may be FePtRh. In this case, the ratio of Rh becomes lower as compared with the second magnetic layer.

When the first magnetic layer 52 is formed by use of FePt, the ratio of Fe and Pt is preferably Fe:Pt=40:60 to 60:40. Further, the amount of a third element is preferably from 3 to 15 at %, based on the total atoms included in the ordered alloy.

The first magnetic layer can be formed by depositing constituent elements of an ordered alloy and an optional third element, by use of a sputtering method.

"sputtering" as used herein means only a step of causing atoms, clusters or ions to be ejected from a target by collision of ions with high energy, and does not mean that all elements included in the ejected atoms, clusters or ions are fixed onto a substrate to be deposited. In other words, a thin film obtained in a process of "sputtering" as used herein does not necessarily includes elements arriving at a substrate to be deposited at a ratio of the amount as arrived. In the formation of the first magnetic layer 52, for the respective constituent elements of an ordered alloy and an optional third element, all different targets can be used. Alternatively, a target including constituent elements of an ordered alloy and a target of an optional third element may be used. Furthermore, when a third element is essential, a target including all of constituent elements of an ordered alloy and the third element may be used. In each case, a ratio of a magnetic crystal grain and a non-magnetic crystal grain boundary can be controlled by adjusting an electric power to be applied to each target.

When the first magnetic layer 52 is formed, the substrate is heated. The substrate temperature in the heating lies within a range of 300° C. to 450° C. By employing substrate temperature falling within the range, a degree of order in an ordered alloy in the first magnetic layer 52 can be improved.

Moreover, the first magnetic layer 52 has thickness of 1 to 10 nm, preferably 2 to 4 nm.

The second magnetic layer 54 of the magnetic recording layer 50 contains FePtRh as an ordered alloy. The second magnetic layer 54 can further comprise optionally the above-described third element. For the formation of the second magnetic layer 54, targets similar to those for the first magnetic layer 52 can be used, except for using a Rh target. Further, the second magnetic layer 54 is formed using the conditions similar to those for the first magnetic layer.

In the formation of the second magnetic layer 54, the quantity of Rh is preferably 5 to 25 at % based on the total atoms constituting an ordered alloy. Further, the ratio in FePt in the ordered alloy is preferably Fe:Pt=40:60 to 60:40. Furthermore, when a third element exists, the amount thereof is preferably 3 to 15 at % based on the total atoms constituting the ordered alloy.

Further, the second magnetic layer 54 has thickness of 3 to 10 nm, preferably 4 to 6 nm.

Figure 2A:
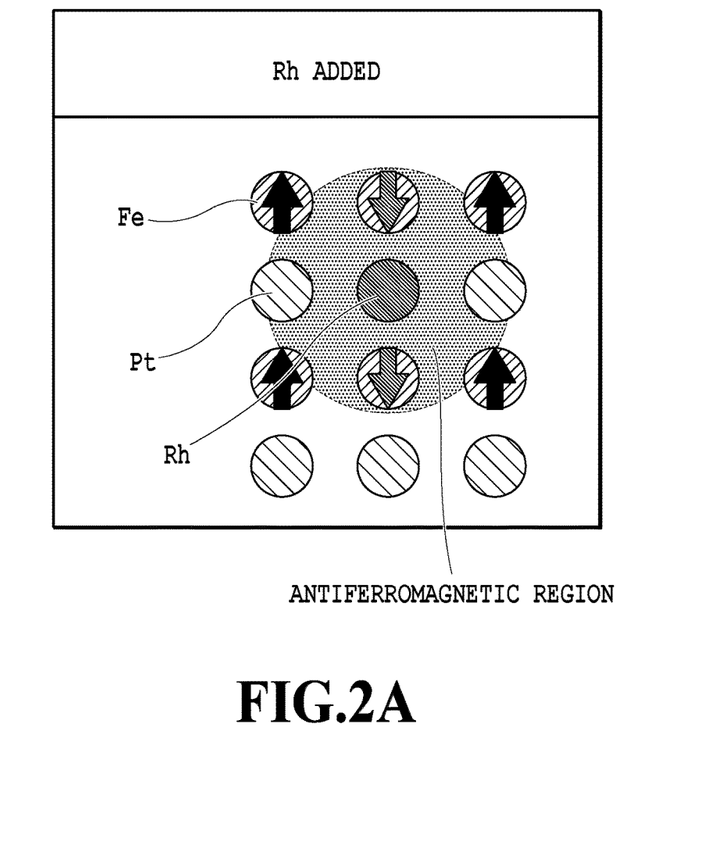
FIG. 2A is a schematic view for explaining a state where an FePt ordered alloy is used for a magnetic layer of a magnetic recording medium and Rh is added thereto, and a schematic view showing a state of an FePtRh ordered alloy.
Figure 2B:
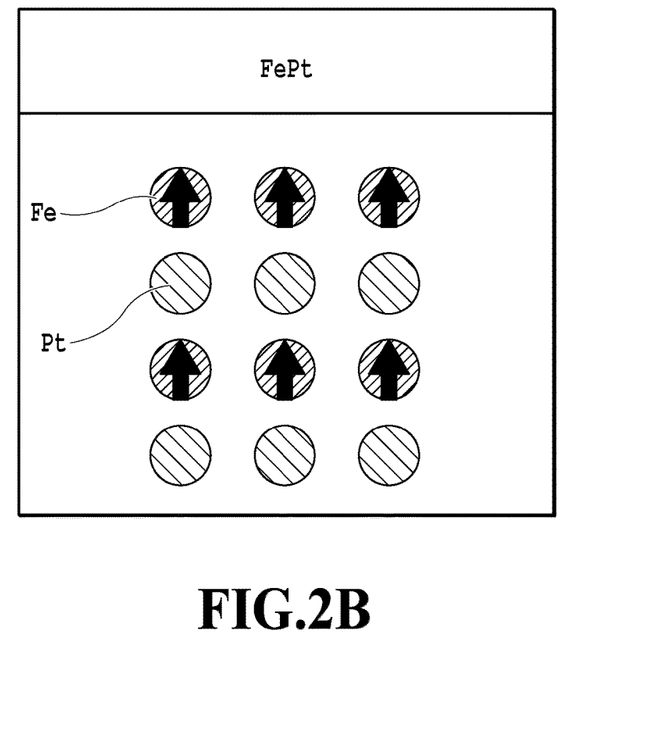
FIG. 2B is a schematic view for explaining a state where an FePt ordered alloy is used for a magnetic layer of a magnetic recording medium, and a schematic view showing a state of an FePt ordered alloy.

Without intended to be restricted by any theory, the addition of Rh to the second magnetic layer will be described with reference to FIG. 2A and FIG. 2B.

It is well known that, by inserting a thin coupling layer comprised of a non-magnetic transition metal such as Rh, Cu or Cr between ferromagnetic layers in a magnetic recording layer of a magnetic recording medium, adjacent magnetic layers form antiferromagnetic exchange coupling. An antiferromagnetic coupling energy changes depending on kinds of elements, structure of the layers to be sandwiched, or the like. When the maximum values of antiferromagnetic exchange coupling energies are compared for coupling layers using the above-described elements, the antiferromagnetic exchange coupling energy when Rh is used as a coupling layer is particularly large. Further, it is known that Rh can exert the above-described effect in a thin film thickness. In addition, according to experiments of the present inventors, it was ascertained that, when Ku of layers are equal to each other, the addition of Rh to an ordered alloy such as FePt provided a small saturation magnetization Ms of the layer as compared with the addition of another element such as Cu. When these points are considered comprehensively, it is guessed that a phenomenon similar to an antiferromagnetic coupling, in which a couple having an inverse spin direction is generated via the added Rh, occurs in the layer. In the present invention, the ordered alloy FePtRh is a ferromagnetic material in the second magnetic layer, but it is considered that a region having antiferromagnetic properties is brought about locally around Rh, for example as shown in FIG. 2A, and that Fe atoms form a couple so as to have spins of opposite directions across a Rh atom. It is considered that, as the result, magnetic properties are modified. This is considered to be a feature different from that of FePt as an ordered alloy to which no Rh is added, shown in FIG. 2B. It is considered that, as described above, the generation of an antiferromagnetic coupling via the added Rh in a part of the inside of an ordered alloy makes it easy to generate disturbance of whole spins at relatively low temperatures to thereby lower Tc and give such a steep temperature property that a gradient of magnetic property relative to temperature becomes large.

As a result that a steep temperature property is obtained, significant lowering of Ku becomes possible in temperature regions in which recording is performed to thereby lower a switching magnetic field and make recording easier. On the other hand, the addition of Rh causes the lowering of Ku at room temperature which generally lies in a temperature region in which the record is held. As the result, the addition of Rh causes the lowering of thermal stability in a temperature region in which the record is held. Accordingly, the laminating of the first magnetic layer aims at securing thermal stability. That is, the laminating of the first magnetic layer having large Ku at room temperature as compared with a Rh-added second magnetic layer makes it possible to secure thermal stability at room temperature.

In the present invention, as the result that the magnetic recording layer 50 has the above-described laminated structure of the first magnetic layer 52 and the second magnetic layer 54, recording temperature becomes a lower temperature, magnetization inversion at a low magnetic field becomes possible, and thermal stability at temperatures at which the record is held can be secured.

In the magnetic recording layer 50, the first magnetic layer may be formed on the substrate side and the second magnetic layer on the outer layer side of the magnetic recording medium, or the configuration opposite thereof may be employed.

In the magnetic recording layer 50, both the first magnetic layer and the second magnetic layer may have a granular structure containing a magnetic crystal grain and a non-magnetic crystal grain boundary surrounding the magnetic crystal grain. The magnetic crystal grain can comprise the above-described ordered alloy. The non-magnetic crystal grain boundary can comprise at least one material selected from the group consisting of oxides such as $SiO_2$, $TiO_2$ and ZnO; nitrides such as SiN and TiN; carbon (C); and boron (B). For example, the non-magnetic crystal grain boundary may comprise a mixture of carbon (C) and boron (B). In the present invention, preferably the first magnetic layer is a layer including a layer consisting of FePt—C, comprising an ordered alloy consisting of FePt and a non-magnetic crystal grain boundary consisting of carbon (C). In the magnetic recording medium, regarding contents of the magnetic crystal grain and the material of non-magnetic crystal grain boundary, it is preferable that magnetic crystal grain is 50 to 90 vol %, and the material of non-magnetic crystal grain boundary is 10 to 50 vol %.

The magnetic recording layer 50 may further comprise one or a plurality of additional magnetic layers in addition to the first magnetic layer 52 and the second magnetic layer 54. Each of the one or a plurality of additional magnetic layers may have either a granular structure or a non-granular structure. For example, an ECC (Exchange-coupled Composite) structure may be formed by laminating a laminate including the first magnetic layer 52 and the second magnetic layer 54 and an additional magnetic layer, with a coupling layer such as Ru inserted between these. Alternatively, a magnetic layer without a granular structure may be provided on the upper part of a laminated structure including the first magnetic layer 52 and the second magnetic layer 54, as a continuous layer. The continuous layer includes a so-called CAP layer. The thickness of the first magnetic layer is 1 nm or more and 10 nm or less, preferably 1.5 nm or more and 4 nm or less. The thickness of the second magnetic layer is 1 nm or more and 20 nm or less, preferably 1.5 nm or more and 10 nm or less.

The protective layer 60 can be formed by use of a material commonly used in the field of a magnetic recording medium. Specifically, the protective layer 60 can be formed by use of a non-magnetic metal such as Pt, a carbon-based material such as diamond-like carbon, or a silicon-based material such as silicon nitride. Further, the protective layer 60 may be a single layer, or may have a laminated structure. The protective layer 60 of a laminated structure, for example, may be a laminated structure of two types of carbon-based materials having different properties, a laminated structure of a metal and a carbon-based material, or a laminated structure of a metal oxide film and a carbon-based material. The protective layer 60 can be formed by use of any process known in the art, such as a CVD method, a sputtering method (including a DC magnetron sputtering method etc.) and a vacuum deposition method.

Optionally, the magnetic recording medium of the present invention may be further provided with a liquid-lubricant layer (not shown) on the protective layer 60. The liquid-lubricant layer can be formed by use of a material commonly used in the field of magnetic recording medium. Examples of materials of the liquid-lubricant layer include perfluoropolyether-based lubricants, etc. The liquid-lubricant layer can be formed, for example, by use of a coating method such as a dip coat method or a spin coat method.

EXAMPLES

Hereinafter, the present invention will be described based on Examples, but following Examples are not intended to limit the present invention.

Example 1

In the Example, intensity of a magnetic field necessary for magnetization inversion (switching magnetic field) and thermal stability at room temperature were evaluated for a magnetic recording medium including a substrate and a magnetic recording layer consisting of a first magnetic layer and a second magnetic layer. In switching magnetic field and the thermal stability of the two-layer medium, Ms, Hk, an exchange coupling constant, easy axis distribution etc., of respective layers involve, and in a case of a heat-assisted medium the temperature dependencies thereof are furthermore added, and therefore it is difficult to estimate by analytical calculations. Consequently, micromagnetic simulation was used. Meanwhile, the switching magnetic field is also a physical quantity expressing writing properties.

The evaluated magnetic recording medium has a film configuration having laminated therein the first magnetic layer of FePt (2 nm) and the second magnetic layer of FePtX (5 nm) (X=Rh or Cu). The intensity of a magnetic field necessary for magnetization inversion when recording temperature was set to 450 K, and thermal stability at room temperature were calculated. In the simulation, it was assumed that magnetic grains were columnar having a diameter of 7 nm.

The micromagnetic simulation is one of numerical calculation techniques for obtaining a magnetized state of a magnetic body, characterized in that a region to be analyzed is divided into minute calculation cells and the magnetic moments caused by a plurality of magnetic spins in each of cells are represented by one macro magnetic moment, the magnitude of which is constant and only the direction of which varies.

In the micromagnetic simulation, in order to obtain time evolution of a magnetic moment, a differential equation, usually called a Landau-Lifshitz-Gilbert (LLG) equation, expressing a precession movement and braking movement of the magnetic moment is used.

In the simulation, a magnetic grain was assumed to be of a 7-nanometer quadrangular prism, which was laid out in 16 in each of longitudinal and horizontal directions to constitute a magnetic recording layer with 256 magnetic grains in total. Then, the whole analysis region is digitized with a rectangular parallelepiped cell having length, width and height of 7 nm×7 nm×2 nm. A magnetostatic field energy, exchange energy, anisotropic energy, Zeeman energy and thermal energy were taken into consideration as the magnetic energy.

Magnetic properties of the first layer and the second layer were as shown in Table 1. Each of layers was deposited by a procedure below, and magnetic properties were evaluated.

A chemically reinforced glass substrate having a smooth surface (N-10 glass substrate, manufactured by HOYA) was washed to prepare a substrate 10. The substrate 10 after the washing was introduced into an in-line type sputtering apparatus. By a DC magnetron sputtering method using a pure Ta target in Ar gas of 0.5 Pa in pressure, a Ta adhesion layer 20 of 5 nm in thickness was formed. Substrate temperature in forming the Ta adhesion layer was room temperature (25° C.). A sputtering electric power in forming the Ta adhesion layer was 100 W.

Then, by a DC magnetron sputtering method using a pure Cr target in Ar gas of 0.5 Pa in pressure, a Cr underlayer 30 of 20 nm in thickness was obtained. Substrate temperature in forming the Cr underlayer 30 was room temperature (25° C.). A sputtering electric power in forming the Cr underlayer 30 was 300 W.

Then, by an RF magnetron sputtering method using a MgO target in Ar gas of 0.1 Pa in pressure, a MgO seed layer 40 of 5 nm in thickness was formed. Substrate temperature in forming the MgO seed layer 40 was room temperature (25° C.). A sputtering electric power in forming the MgO seed layer 40 was 200 W.

Then, a laminated body in which the MgO seed layer 40 was formed was heated to 430° C., and, by a DC magnetron sputtering method using an FePt target in Ar gas of 1.5 Pa in pressure, an FePt layer consisting of FePt was formed. The thickness of the FePt layer was 10 nm. An electric power applied to the target in forming the FePt layer was 300 W (FePt). Contents of respective elements in the layer consisting of FePt are listed in Table 1.

A layer consisting of FePtRh was deposited by heating the laminated body in which the MgO seed layer 40 was formed to 430° C., and by a DC magnetron sputtering method using an FePt target and a Rh target in Ar gas of 1.5 Pa in pressure. The composition of FePtRh was $Fe_{48}Pt_{42}Rh_{10}$. Electric powers applied to respective targets in forming the layer consisting of FePtRh were 300 W (FePt) and 130 W (Rh). The thickness was 10 nm. A layer consisting of FePtCu was deposited by a DC magnetron sputtering method using an FePt target and a Cu target, in the same way as in formation of the layer consisting of FePtRh. The composition of FePtCu was $Fe_{48}Pt_{42}Cu_{10}$. Electric powers applied to respective targets in forming the layer consisting of FePtCu were, respectively, 300 W (FePt) and 80 W (Cu). The thickness was 10 nm. With the above procedure, a magnetic recording layer was formed. Contents of respective elements in the layer consisting of FePtRh, and the layer consisting of FePtCu are listed in Table 1.

Finally, a Pt protective layer 60 of 5 nm in thickness was formed by a DC sputtering method using a Pt target in Ar gas of 0.5 Pa in pressure to obtain a magnetic recording medium. Substrate temperature in forming the protective layer was room temperature (25° C.). A sputtering electric power in forming the Pt protective layer 60 was 50 W.

Saturation magnetization Ms of the obtained magnetic recording medium was measured by use of a vibration sample type magnetometer (VSM). Further, the obtained magnetic recording medium was heated to room temperature (RT: 298 K (25° C.)) and 450 K, and saturation magnetization Ms (T) was measured at room temperature and 450 K by use of a vibration sample type magnetometer (VSM). Furthermore, square of the saturation magnetization $Ms^2(T)$ was plotted relative to a plurality measurement temperatures (T) including room temperature and 450 K, and a regression line was obtained by a least-squares method. The obtained regression line was extrapolated up to a point of $Ms^2=0$ thereby to obtain the Curie temperature Tc. Results are listed in Table 1.

Moreover, by use of the anomalous Hall effect, a magnetic anisotropy constant Ku of the obtained magnetic recording layer 50 was obtained. Specifically, at room temperature (RT), a magnetic torque curve was measured under an external magnetic field of 7 T, and, from fitting of the obtained torque curve, a magnetic anisotropy constant Ku (RT) at room temperature was calculated. The abbreviation "RT" means room temperature (298 K (25° C.)).

Subsequently, by use of Formula (1), magnetic anisotropy constants Ku (T) at room temperature and temperature of 450 K were calculated.

$$Ku(T)=Ku(RT)\times[Tc-T]/[Tc-RT] \qquad (1)$$

Further, by use of Formula (2), from saturation magnetizations Ms (T) and magnetic anisotropy constants Ku(T) at room temperature and temperature 450 K, anisotropic magnetic fields Hk(T) at room temperature and 450 K were calculated.

$$Hk(T)=2\times Ku(T)/Ms(T) \qquad (2)$$

TABLE 1

| | | Magnetic properties at RT | | | | Magnetic properties at 450K | | |
| --- | --- | --- | --- | --- | --- | --- | --- | --- |
| Material | Tc (K) | Ms (emu/cc) | Ku (erg/cc) | Hk (kOe) | | Ms (emu/cc) | Ku (erg/cc) | Hk (kOe) |
| First layer [layer consisting of FePt] | | | | | | | | |
| $Fe_{53}Pt_{47}$ | 740 | 1044 | 3.08E+07 | 59.0 | | 843 | 2.01E+07 | 47.6 |
| Second layer [layer consisting of FePtX (X = Rh or Cu)] | | | | | | | | |
| $Fe_{48}Pt_{42}Rh_{10}$ | 490 | 708 | 2.03E+07 | 57.5 | | 300 | 3.63E+06 | 24.4 |
| $Fe_{48}Pt_{42}Cu_{10}$ | 650 | 949 | 2.05E+07 | 43.1 | | 708 | 1.14E+07 | 32.2 |

Results of the simulation are as listed in Table 2. Meanwhile, for an FePt (7 nm) single film, calculation was also performed for comparison. Thermal stability can be obtained from a formula below.

$$\text{Thermal stability} = Ku \cdot V/kT$$

where Ku: magnetic anisotropy constant
V: volume of one magnetic fine grain
k: Boltzmann constant
T: absolute temperature

TABLE 2

| | Results of simulation | | |
|---|---|---|---|
| Film configuration [1] | FePtRh(5 nm)/ FePt(2 nm) | FePtCu(5 nm)/ FePt(2 nm) | FePt(7 nm) |
| Switching magnetic field (@450 K) [kOe] | 17.2 | 24.8 | 34.4 |
| Thermal stability (@300 K) | 111.2 | 113.9 | 157.2 |

[1] Configuration of magnetic recording layer: second magnetic layer/first magnetic layer. Terms in round brackets denote thickness.

As a result, a switching magnetic field became 17 KOe in a condition of an FePtRh/FePt laminated film, and a value recordable with a magnetic head was obtained. In FePtCu/FePt and an FePt single layer film, switching magnetic field exceed 20 kOe, and writing with a magnetic head can not be performed. It was known that, at recording temperature 450 K, recording was possible only with the structure of FePtRh/FePt.

Moreover, as a result of comparing thermal stability at room temperature (300 K), similar results were obtained for FePtRh/FePt and FePtCu/FePt.

Meanwhile, the reason why recording temperature is set to 450 K in the simulation is that thermal decomposition temperature of a generally used lubricant is around 450 K (see Japanese Patent Laid-Open No. 2015-040244, P 16, Table 1, Z-dol).

Furthermore, in the evaluation, a switching magnetic field of not more than 20 kOe was selected as a preferable value. The reason is that, a value used as a recording magnetic field in the present situation is generally around 18 kOe to 20 kOe (see Japanese Patent Laid-Open No. 2010-003408, paragraphs 0034, 0046 etc.). Further, another reason is that a high Bs material for use in a magnetic pole of a recording head has reached a physical limit and, at the present time, the increase in a recording magnetic field exceeding the present situation can not be expected.

By setting the first magnetic layer to a layer having high Ku (for example, FePt, FePtRh of a Rh concentration lower than that in the second magnetic layer), Ku as a whole can be maintained.

It is said that the limit of the magnetic field of a recording head is around 20 kOe. With the above-described configuration of a magnetic recording medium, at lower temperature, a switching magnetic field can be set to be equal to less than 20 kOe which can be output from a magnetic head.

From the above results, it is known that the addition of Rh results in equal thermal stability and exerts effects of lowering recording temperature and a recording magnetic field, as compared with the addition of Cu.

The layer configuration of a magnetic recording layer herein may be described by use of "/". In the expression, the left side of "/" indicates the second magnetic layer, and the right side of "/" indicates the first magnetic layer. Accordingly, for example, when shown as "FePtRh/FePt", it means that the first magnetic layer is a layer consisting of FePt, and that the second magnetic layer is a layer consisting of FePtRh.

Example 2) and (Comparative Example)

In the Example, a magnetic recording medium, in which FePt—C (2 nm) was deposited as a first magnetic layer, and FePt—Rh (3 nm) or FePt (3 nm) was deposited as a second magnetic layer, was produced, and the saturation magnetization (Ms) and coercive force (Hc) at room temperature (RT), coercive force (Hc) at 450 K, and thermal stability at 300 K were measured.

In the same way as in Example 1, a glass substrate (N-10 glass substrate, manufactured by HOYA) was prepared, and the Ta adhesion layer 20 of 5 nm in thickness, the Cr underlayer 30 of 20 nm in thickness, and the MgO seed layer 40 of 5 nm in thickness were formed.

(Deposition of First Magnetic Layer)

Then, a laminated body in which the MgO seed layer 40 was formed was heated to 450° C., and an FePt—C layer consisting of 60 vol % $Fe_{50}Pt_{50}$-40 vol % C was formed by a DC magnetron sputtering method using an FePt—C target in Ar gas of 1.5 Pa in pressure. The thickness of the FePt—C layer was 2 nm. An electric power applied to the target in forming the FePt—C layer was 300 W. Contents of respective elements in the layer consisting of FePt—C are listed in Table 3. The FePt—C layer has a granular structure in which FePt works as a magnetic crystal grain and C (carbon) works as a non-magnetic grain boundary material.

(Deposition of Second Magnetic Layer)

As the second magnetic layer, a layer consisting of FePtRh (Example 2) or a layer consisting of FePt (Comparative Example) was formed. The layer consisting of FePtRh was deposited by a DC magnetron sputtering method using an FePtRh target in Ar gas of 1.5 Pa in pressure, with heating the laminated body in which the MgO seed layer 40 was formed to 450° C. An electric power applied to the target in forming the layer consisting of FePtRh was 300 W. Further, the layer consisting of FePt was formed by a DC magnetron sputtering method using an FePt target, in the same way as that in the layer consisting of FePtRh. An electric power applied to the target in forming the layer consisting of FePt was 300 W. The layer consisting of FePtRh and the layer consisting of FePt had the thickness of 3 nm. Contents of respective elements in the layer consisting of FePtRh, or the layer consisting of FePt are listed in Table 3.

Finally, the Pt protective layer 60 of 5 nm in thickness was formed in the same way as in Example 1 thereby to obtain a magnetic recording medium. Configurations of layers are listed in Table 3.

Here, in the Example, FePt—C was used as a material of the first magnetic layer. The reason is that order properties deteriorate when deposition is performed using FePt as a material of the first magnetic layer and FePtRh as a material of the second magnetic layer. Meanwhile, Ku etc. are not different between FePt—C and FePt. Accordingly, a magnetic recording layer was formed by use of FePt—C as a material of the first magnetic layer, and FePtRh or FePt as a material of the second magnetic layer, and properties such as thermal stability were studied.

TABLE 3

|  | Example 2 | Comparative Example |
|---|---|---|
| Second magnetic layer | $Fe_{45}Pt_{47}Rh_8$ | $Fe_{50}Pt_{50}$ |
| First magnetic layer | 60 vol % ($Fe_{50}Pt_{50}$)-40 vol % C | 60 vol % ($Fe_{50}Pt_{50}$)-40 vol % C |

Saturation magnetization Ms of the obtained magnetic recording medium was measured at room temperature (RT: 298 K (25° C.)) by use of a vibration sample type magnetometer (VSM). Further, the obtained magnetic recording medium was heated to room temperature (RT: 298 K (25° C.)) and 450 K, and coercive force (Hc) was measured at room temperature and 450 K by use of a vibration sample type magnetometer (VSM). Thermal stability and writing properties at 450 K, which was lower as compared with conventional temperature, were evaluated by Hc at 450 K. Results are shown in Table 4.

TABLE 4

| Configuration of magnetic recording layer [1] | Example 2 FePtRh(3 nm)/ FePt—C(2 nm) | Comparative Example FePt(3 nm)/ FePt—C(2 nm) |
|---|---|---|
| Ms(@RT) [emu/cm$^3$] | 798 | 859 |
| Hc(@RT) [kOe] | 14.7 | 15.7 |
| Thermal stability (@300 K) | 85.5 | 113.9 |
| Hc(@450 K) [kOe] | 6.6 | 9.7 |

[1] Configuration of magnetic recording layer: second magnetic layer/first magnetic layer. Terms in round brackets show thickness.

The magnetic recording medium including the magnetic recording layer of FePtRh/FePt—C has thermal stability larger than 60, and good long period reliability is obtained. Further, coercive force at 450 K obtained by VSM measurement is as small as 6.6 kOe, and it is supposed that a switching magnetic field in writing with an actual head becomes 20 kOe or less. Furthermore, Ms was large. Therefore, it is considered that signal intensity in the magnetic recording medium becomes conveniently large.

On the other hand, in the magnetic recording medium including a magnetic recording layer of FePt/FePt—C that has substantially the same Ku in the first magnetic layer and the second magnetic layer, although thermal stability is larger than 60 to obtain good long period reliability, coercive force (Hc) at 450 K by VSM measurement is as large as 9.7 kOe, and it is supposed that a switching magnetic field in writing with an actual head becomes larger than 20 kOe.

As described above, also in an actual magnetic recording medium, the same results as those in the simulation were obtained. When FePtRh/FePt—C is compared with FePt/FePt—C, coercive force (Hc) corresponding to a switching magnetic field decreased in FePtRh/FePt—C. Further, as to thermal stability, although slight lowering was observed in FePtRh, stability substantially the same degree as that of FePt/FePt—C could be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. All of the patent applications and documents cited herein are incorporated herein by reference in their all entirety.

What is claimed is:

1. A magnetic recording medium comprising: a substrate; and a magnetic recording layer comprising a first magnetic layer and a second magnetic layer,
wherein
said first magnetic layer comprises a magnetic crystal grain and non-magnetic crystal grain boundary, the magnetic crystal grain consisting of an FePt ordered alloy and the non-magnetic crystal grain boundary consisting of carbon (C),
said second magnetic layer comprises an FePtRh ordered alloy, an amount of Rh being 5 to 25 at % based on the total atoms constituting the ordered alloy, and
said first magnetic layer has a magnetic anisotropy constant (Ku) at room temperature larger than Ku at room temperature of said second magnetic layer,
wherein said first magnetic layer is formed on the substrate side, and said second magnetic layer is formed in an upper layer of said first magnetic layer.

2. A magnetic recording medium comprising: a substrate; and a magnetic recording layer comprising a first magnetic layer and a second magnetic layer,
wherein
said first magnetic layer comprises a magnetic crystal grain and non-magnetic crystal grain boundary, the magnetic crystal grain consisting of an FePt ordered alloy and the non-magnetic crystal grain boundary consisting of carbon (C),
said second magnetic layer comprises an FePtRh ordered alloy, an amount of Rh being 5 to 25 at % based on the total atoms constituting the ordered alloy, and
said first magnetic layer has a magnetic anisotropy constant (Ku) at room temperature larger than Ku at room temperature of said second magnetic layer,
wherein said first magnetic layer is formed on the substrate side, and said second magnetic layer is formed in an upper layer of said first magnetic layer, and
wherein
said first magnetic layer and said second magnetic layer have a granular structure containing a magnetic crystal grain and a non-magnetic crystal grain boundary surrounding the magnetic crystal grain.

3. A magnetic recording medium comprising: a substrate; and a magnetic recording layer comprising a first magnetic layer and a second magnetic layer,
wherein
said first magnetic layer comprises a magnetic crystal grain and non-magnetic crystal grain boundary, the magnetic crystal grain consisting of an FePt ordered alloy and the non-magnetic crystal grain boundary consisting of at least one of carbon (C), boron (B), or a mixture thereof,
said second magnetic layer comprises an FePtRh ordered alloy, an amount of Rh being 5 to 25 at % based on the total atoms constituting the ordered alloy, and
said first magnetic layer has a magnetic anisotropy constant (Ku) at room temperature larger than Ku at room temperature of said second magnetic layer,
wherein said first magnetic layer is formed on the substrate side, and said second magnetic layer is formed in an upper layer of said first magnetic layer, and
wherein
said first magnetic layer and said second magnetic layer have a granular structure containing a magnetic crystal grain and a non-magnetic crystal grain boundary surrounding the magnetic crystal grain.

* * * * *